(12) United States Patent
Testa et al.

(10) Patent No.: US 12,309,619 B2
(45) Date of Patent: May 20, 2025

(54) CONTROL NETWORK NODE, NETWORK NODE AND METHODS PERFORMED THEREIN

(71) Applicant: Telefonaktiebolaget LM Ericsson (publ), Stockholm (SE)

(72) Inventors: Patrizia Testa, Solna (SE); Helia Niroomand Rad, Stuttgart (DE); Sachin Sharma, Huddinge (SE); Ke Wang Helmersson, Linköping (SE); Fredrik Lundqvist, Tranås (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 384 days.

(21) Appl. No.: 17/789,937

(22) PCT Filed: Dec. 31, 2019

(86) PCT No.: PCT/SE2019/051347
§ 371 (c)(1),
(2) Date: Jun. 29, 2022

(87) PCT Pub. No.: WO2021/137744
PCT Pub. Date: Jul. 8, 2021

(65) Prior Publication Data
US 2023/0044736 A1 Feb. 9, 2023

(51) Int. Cl.
*H04W 52/24* (2009.01)
*H04B 17/29* (2015.01)
(Continued)

(52) U.S. Cl.
CPC .......... *H04W 24/02* (2013.01); *H04W 16/14* (2013.01); *H04W 52/243* (2013.01)

(58) Field of Classification Search
CPC ... H04W 24/02; H04W 16/14; H04W 52/243; H04W 72/54; H04W 24/04; H04W 88/18;
(Continued)

(56) References Cited

U.S. PATENT DOCUMENTS 6,862,275 B1 * 3/2005 Dabak .................. H04L 1/0054
375/267
10,285,074 B1 * 5/2019 Pankajakshan ....... H04W 24/02
(Continued)

FOREIGN PATENT DOCUMENTS

WO 2017075625 A1 5/2017
WO 2019010049 A1 1/2019

OTHER PUBLICATIONS

3GPP TR 36.790 V15.0.0; 3rd Generation Partnership Project; Technical Specification Group Radio Access Network; Evolved Universal Terrestrial Radio Access (E-UTRA); LAA/eLAA for the "CBRS" 3.5GHz band in the United States (Release 15); Dec. 2017, consisting of 31 pages.
(Continued)

*Primary Examiner* — Andrew Wendell
(74) *Attorney, Agent, or Firm* — Weisberg I.P. Law, P.A.

(57) ABSTRACT

A method performed by a control network node for handling a radio resource in a frequency band. The control network node receives an indication related to a performance of a first radio network node or a performance of user equipment served by the first radio network node. The control network node further triggers a performance adjustment related to at least one radio network node of a number of radio network nodes or to the first the radio network node based on the indication.

19 Claims, 12 Drawing Sheets

(51) Int. Cl.
*H04W 16/14* (2009.01)
*H04W 24/02* (2009.01)

(58) Field of Classification Search
CPC ............. H04W 16/10; H04W 52/0235; H04W 52/0225; H04W 52/24; H04W 52/26; H04B 17/15; H04B 17/29; H04B 17/296; H04B 17/309; H04B 17/336
See application file for complete search history.

(56) References Cited

U.S. PATENT DOCUMENTS

| | | | |
|---|---|---|---|
| 2013/0028107 A1* | 1/2013 | Ho | H04W 24/02 370/252 |
| 2014/0269251 A1 | 9/2014 | Zhou et al. | |
| 2016/0095136 A1* | 3/2016 | Carbonelli | H04L 5/0005 370/329 |
| 2017/0290059 A1* | 10/2017 | Karaki | H04W 16/14 |
| 2018/0132112 A1 | 5/2018 | Khoshnevisan et al. | |
| 2018/0139626 A1* | 5/2018 | Ashworth | H04B 7/15542 |
| 2018/0312112 A1 | 5/2018 | Khoshnevisan et al. | |
| 2018/0242163 A1 | 8/2018 | Patel et al. | |
| 2018/0332660 A1 | 11/2018 | Mueck et al. | |
| 2018/0376429 A1* | 12/2018 | Islam | H04W 52/146 |
| 2020/0137569 A1* | 4/2020 | Jabara | H04N 21/432 |

OTHER PUBLICATIONS

Federal Communications Commission Part 15—Radio Frequency Devices; Authenticated U.S. Government Information; GPO; CFR 2009 Title 47 vol. 1 Part 15; Oct. 1, 2009 Edition, consisting of 120 pages.
Karaki et al. "Coexistence of Contention-Based General Authorized Access Networks in 3.5 GHz CBRS Band"; Ericsson Research, Aachen, Germany; 2018 IEEE 87th Vehicular Technology Conference (VTC Spring); consisting of 6 pages.
Mukherjee et al. "Licensed-Assisted Access LTE: Coexistence with IEEE 802.11 and the Evolution toward 5G"; LTE-Advanced Pro; IEEE Communications Magazine; Jun. 2016, consisting of 8 pages.
International Search Report and Written Opinion dated Nov. 13, 2020 for International Application No. PCT/SE2019/051347 filed Dec. 31, 2019, consisting of 14 pages.

* cited by examiner

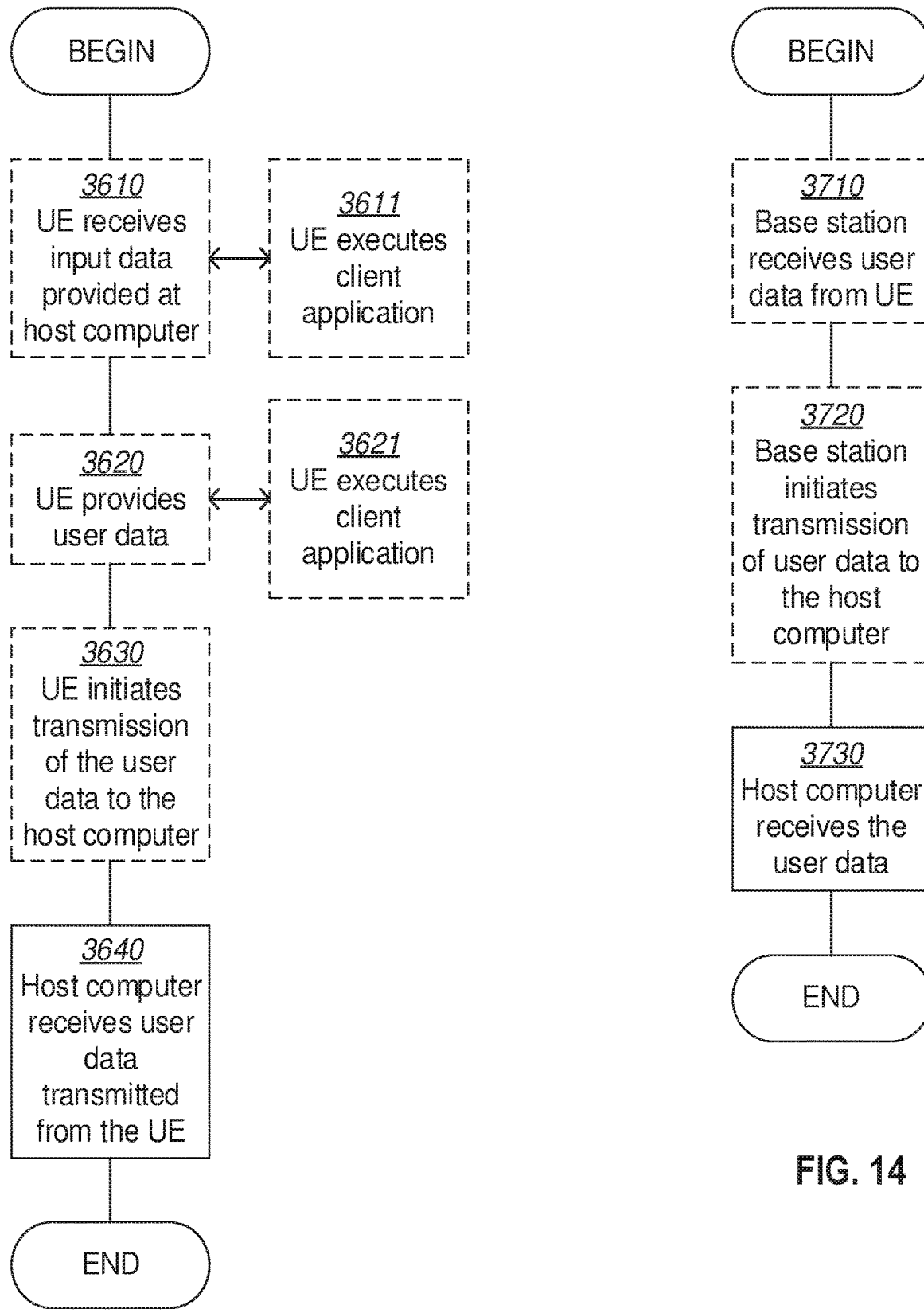

CONTROL NETWORK NODE, NETWORK NODE AND METHODS PERFORMED THEREIN

CROSS-REFERENCE TO RELATED APPLICATIONS

This application is a Submission Under 35 U.S.C. § 371 for U.S. National Stage Patent Application of International Application Number: PCT/SE2019/051347, filed Dec. 31, 2019 entitled "CONTROL NETWORK NODE, NETWORK NODE AND METHODS PERFORMED THEREIN," the entirety of which is incorporated herein by reference.

TECHNICAL FIELD

Embodiments herein relate to a control network node, a first network node and methods performed therein regarding wireless communication. In particular, embodiments herein relate to handling communication, such as controlling, gaining access and/or managing communication, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

As mobile broadband networks continue to evolve, there is an increasing level of interest in utilizing unlicensed and shared spectrum to augment data transmissions in licensed bands. In addition to the standardization of 5 GHz spectrum (Band 46) in 3GPP, Band 49 was also introduced in 3GPP Rel 15 for 3.5 GHz US CBRS band.

3.5 GHz band is governed by new Part 96 of electronic Code of Federal Regulations (eCFR), containing rules to create a three-tiered commercial radio service called Citizens Broadband Radio Service (CBRS). Both licensed and unlicensed use of the 3.5 GHz band is allowed for a wide variety of services that will share spectrum with incumbent federal and non-federal users under Spectrum Access System (SAS) control, which is a control network node.

More specifically, the first and highest tier includes existing primary operations (incumbent users): authorized federal users, Fixed Satellite Service (FSS) earth stations, and Wireless Broadband Licensee authorized to operate in 3650-3700 MHz band; the second tier includes Priority Access (PA) licensees holding one or more authorization to use an unpaired 10 MHz channel in the 3550-3650 MHz range in a given geographic service area; the third tier includes General Authorized Access (GAA) users having general Federal Communication Commission (FCC) license qualifications, which may operate in 3550-3700 MHz frequency range on a shared basis without an individual license, they may use Priority Access licensees (PAL) frequencies outside the PAL protection areas.

The first-tier users authorized by FCC to use 3.5 GHz, i.e., the incumbent users, have the right for the interference protection from the two lower tiers of CBRSs.

The second-tier users, i.e., PALs, are entitled for the interference protection from the third tier such as GAA.

SAS has the duty to ensure protection of incumbent users as well as protection of PALs from the third-tier users e.g. GAA users.

For the Citizens Broadband Radio Service (CBRS) base stations two categories have been introduced by FCC: a) Category A base stations (Cat A BS): The ones with maximum Effective Isotropic Radiated Power (EIRP) output low power of 30 dBm/10 MHz; b) Category B base stations (Cat B BS): The ones with higher Maximum EIRP output power of 47 dBm/10 MHz.

LTE-time division duplex (TDD), Licensed Assisted Access (LAA) and Multefire (MF) are the technologies candidates for GAA in 3.5 GHz where only the latter two are using listen before talk (LBT) mechanism to reduce the coexistence interference while sharing the spectrum with the other operators. Both Band 48 (LTE-TDD) and Band 49 (LAA/evolved LAA) can be adopted by GAA users.

Listen Before Talk (LBT) Mechanism

LBT is a well-known concept to achieve fair sharing among systems operating on the same frequency. This important functionality is adopted by LAA/MF to achieve fair and friendly coexistence with other technologies that share the same spectrum, such as W-Fi. In a few words, Listen-Before-Talk mechanism is based on the energy detection (ED) technique with a certain threshold assigned to the group of nodes as the energy detection threshold. A network node in the group starts to transmit once the received energy is detected to be less than the assigned LBT threshold for a certain period of time also referred to as Back-off period. LBT therefore is a natural candidate for coexistence between co-channel GAA CBRS devices (CBSDs) and end user devices.

More precisely, the LBT mechanism requires a device to perform series of Clear Channel Assessment (CCA) checks using an energy detection (ED) technique before transmitting on the channel. Such a mechanism reduces interferences and increases probabilities of successful transmissions when the energy in a CCA slot is sensed to be below the ED threshold. Regulatory requirements in some regions specify the maximum allowed ED threshold which can be interpreted the limit on the most aggressive behavior transmitters FIG. 1 discloses a GAA channel contention based on Listen-Before-Talk mechanism. A basic illustration of LBT mechanism for a radio network node to start a new transmission burst on DL/UL has been depicted in FIG. 1. The radio network node needs to sense the medium for a random back-off phase of N CCA check slots of 9 μs duration to be idle. The parameter N is chosen randomly within a dynamic Contention Window (CW). These N idle slots do not need to be successive and a back-off counter can be decremented after each idle CCA slot.

If the sensed energy level in a CCA slot is above the ED threshold in the random back-off, then the back-off procedure is paused, and the back-off counter will be stopped. The back-off procedure can be resumed, and the counter begins to count when the medium has been in idle for either a minimum waiting time or a defer period, e.g. 16 μs silent period followed by multiple CCA slots. The back-off counter may be decremented by one after defer is completed.

CBRS rules in United States (US) introduce a framework to introduce LAA in 3.5 GHz band which specify the following requirements for the SAS:

To determine and provide to CBSDs the permissible channels or frequencies at their location;

To determine and provide to CBSDs the maximum permissible transmission power level at their location;

To resolve conflicting uses of the band while maintaining, as much as possible, a stable radio frequency environment;

To facilitate coordination between GAA users operating Category B CBSDs;

and the following for the radio network nodes such as base stations (BSs) and user equipments (UEs):

Power Management: CBSDs and End User Devices shall limit their operating power to the minimum necessary for successful operations.

CBSDs must support transmit power control capability and the capability to limit their maximum EIRP and the maximum EIRP of associated End User Devices in response to instructions from a SAS.

End User Devices shall include transmit power control capability and the capability to limit their maximum EIRP in response to instructions from their associated CBSDs.

Signal Level Reporting: A Citizens Broadband radio Service Device (CBSD) must report to an SAS regarding received signal strength in its occupied frequencies and adjacent frequencies, received packet error rates or other common standard metrics of interference for itself and associated End User Devices as directed by a SAS.

While the mobile broadband networks are evolving, the need to use unlicensed band and share the spectrum is also increasing. LAA has been introduced as a way of using the unlicensed band while the channel access methods are needed to be considered for fair spectrum sharing.

In US, the opening up of the 3550-3700 MHz band for Citizen's Broadband Radio Service (CBRS) represents new opportunities for deploying spectrum-sharing cellular networks. For instance, the three-tier structure of the CBRS sharing regime with different interference protection constraints per tier imposes a coexistence challenge for networks based on LTE. For such framework, eCFR specifies that General Authorized Access Users operating at high power (Category B CBs) must make every effort to cooperate in the selection and use of available frequencies provided by a SAS to minimize the potential for interference and make the most effective use of the authorized facilities. Such users shall coordinate with a SAS before seeking station authorization and make every effort to ensure that their CBSDs operate at a location, and with technical parameters, that will minimize the potential to cause and receive interference among CBSDs.

Operators of CBSDs suffering from or causing harmful interference are expected to cooperate and resolve interference problems through technological solutions or by other mutually satisfactory arrangements.

However, no specific method to address such cooperation for interference avoidance has been defined by FCC in eCFR. In the meanwhile, 3GPP introduced LBT mechanism, i.e., B49 LAA (3550-3700 MHz), as a method of sharing frequency channels assigned by the Spectrum Access System (SAS) to such third tier. It is still important to address that GAA users sharing one or more channel/allocated by the SAS coordinate transmissions among them to improve efficiency in channel utilization, since the more LAA operator networks share the channel, the lower utilization each network will achieve.

It has been shown that LBT is effective in the sense of avoiding the coexistence interference. However, it limits channel utilization in a negative way. If two or more networks using LAA operation share the wireless channel with other operators, then the channel utilization of each LAA network is reduced due to the LBT mechanism. In fact, the listening period before transmitting period prevents constantly transmission and forces LAA network to be able to operate only once LBT mechanism is permitting without considering the traffic load that the networks need to serve at a certain time.

When more LAA BSs are sharing a channel, the lower utilization and throughput for LAA due to the LBT mechanism will be brought. Thus the throughput is decreasing when the channel is shared between more BSs and more networks. This is due to the reason that the cell utilization is going down. Furthermore, if one LAA network is sharing the channel with another operation, then the total cell utilization is less than the case that channel is used only for LTE-TDD operation with the same deployment such as transmitting power, etc. In contrast, if single LAA is using the channel then the cell utilization is more than the case that LTE-TDD is using the channel. A single LAA network may have better performance comparing to the LTE-TDD network, and thus the LAA performance gets better with higher reuse, that is, with fewer BSs sharing the same channel.

SUMMARY

An object herein is to provide a mechanism to handle one or more radio resources such as time and frequency, e.g. handle or manage access to a wireless communication network, to improve performance of the wireless communications network.

According to an aspect the object is achieved, according to embodiments herein, by providing a method performed by a control network node for handling a radio resource in a frequency band. The control network node receives an indication related to a performance of a first radio network node, or a performance of user equipment served by the first radio network node; and triggers a performance adjustment related to at least one radio network node of a number of radio network nodes, or to the first radio network node, based on the indication.

According to another aspect the object is achieved, according to embodiments herein, by providing a method performed by a first radio network node for using one or more radio resources in a frequency band. The first radio network node sends an indication related to a performance of the first radio network node, or a performance of user equipment served by the first radio network node. The first radio network node evaluates a target performance based on a load, a priority and/or service level agreement, and receives an indication of a performance adjustment related to the performance of the first radio network node, or the performance of the user equipment served by the first radio network node. The first radio network node then adjusts the target performance based on the received indication of the performance adjustment.

According to yet another aspect the object is achieved, according to embodiments herein, by providing a control network node for handling a radio resource in a frequency band. The control network node is configured to receive an indication related to a performance of a first radio network node, or a performance of user equipment served by the first radio network node; and to trigger a performance adjustment related to at least one radio network node of a number of radio network nodes, or to the first radio network node, based on the indication.

According to still another aspect the object is achieved, according to embodiments herein, by providing a first radio network node for using one or more radio resources in a frequency band. The first radio network node is configured to send an indication related to a performance of the first radio network node, or a performance of user equipment served by the first radio network node; and to evaluate a target performance based on a load, a priority and/or service level agreement. The first radio network node is further configured to receive an indication of a performance adjustment related to the performance of the first radio network node, or the performance of user equipment served by the first radio network node; and to adjust the target performance based on the received indication of the performance adjustment.

It is furthermore provided herein a computer program product comprising instructions, which, when executed on at least one processor, cause the at least one processor to carry out the method above, as performed by the control network node or the first radio network node. It is additionally provided herein a computer-readable storage medium, having stored thereon a computer program product comprising instructions which, when executed on at least one processor, cause the at least one processor to carry out the method according to the method above, as performed by the control network node or the first radio network node.

Embodiments herein allow operation of radio network nodes that e.g. share the same radio channel, and in particular, when the wireless communication network has and uses sensing capability such as an LBT contention-based channel access mechanism.

Embodiments herein may control the radio network nodes, e.g. the at least one of the number of the radio network nodes and/or the first radio network node, in the wireless communication network, which radio network nodes are allowed to access the channel simultaneously in a given interval of time. This allows e.g. an LBT mechanism to work more efficiently with less retries and thus increasing utilization and performance of the wireless communication network.

Embodiments herein provide an efficient way for managing communication in the wireless communication network that allows resource sharing capabilities between the transmissions of e.g. two LAA communication systems even in a co-channel scenario. The mutual interference is reduced and hence utilization is improved by resource partitioning, channel reuse and switching on-off BSs, between the two systems but only when needed. The method allows to adapt transmission period of BSs to their actual load improving flexibility and efficiency in resource utilization. The method introduces a coordination mechanism between the BSs through the SAS introducing BSs prioritization based on the actual channel utilization by exploiting the CBRS framework specified by FCC for 3.5 GHz CBRS band. The method allows efficient coexistence between BSs of different power while maintain the same LBT threshold. The method allows to control the interference in a single LAA network also, exploiting information on interference experienced by UEs and controlling the Beam direction of base stations that may be close to each other.

BRIEF DESCRIPTION OF THE DRAWINGS

Embodiments will now be described in more detail in relation to the enclosed drawings, in which:

FIGS. 11-14 are flowcharts illustrating methods implemented in a communication system including a host computer, a base station and a user equipment.

DETAILED DESCRIPTION

Figure 1:
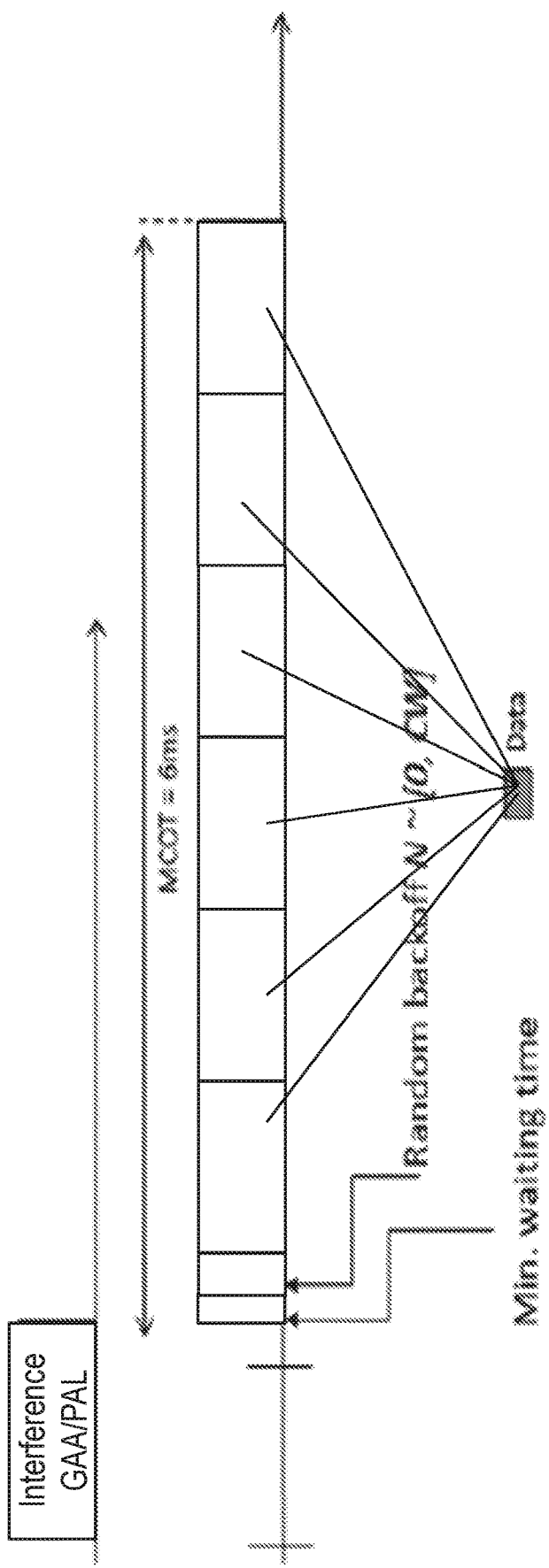
FIG. 1 is a block diagram depicting an LBT mechanism according to prior art.
Figure 2:
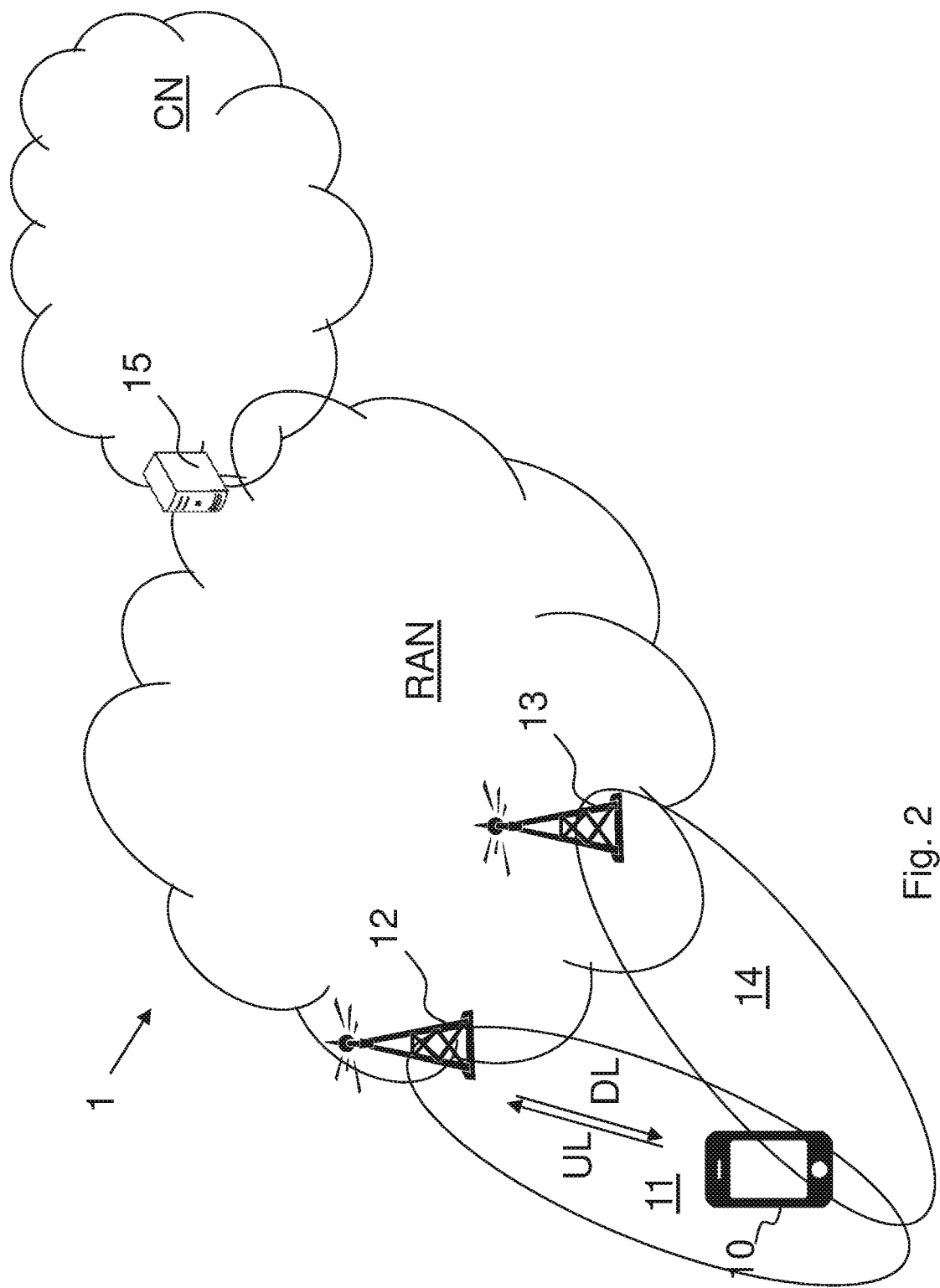
FIG. 2 is a schematic overview depicting a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 exemplified herein as a wireless device such as a mobile station, a non-access point (non-AP) station (STA), a STA and/or a wireless terminal, is comprised, the UE 10 communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablet or even a small base station capable of communicating using radio communication with a radio network node e.g. of the wireless communications network 1 within an area served by the radio network node.

The wireless communications network 1 comprises a first radio network node 12 providing radio coverage over a geographical area, a first service area, of a first radio access technology (RAT), such as NR, LTE, Wi-Fi, WLAN or similar. The first radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the radio network node depending e.g. on the first radio access technology and terminology used. The radio network node may be referred to as a serving radio network node wherein the service area may be referred to as a serving cell, and the serving network node communicates with the UE in form of DL transmissions to the UE and UL transmissions from the UE. It should be noted that a service area may be denoted as cell, beam, beam group or similar to define an area of radio coverage. The wireless communications network 1 may comprise a number of further radio network nodes such as a second radio network node 13 providing radio coverage over a geographical area, a second service area 14, of a second radio access technology (RAT), such as NR, LTE, Wi-Fi, WLAN or similar. The second radio network node 13 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the radio network node depending e.g. on the second radio access technology and terminology used. The second RAT may be same or different as compared to the first RAT. The second radio network node 13 may be referred to as a secondary serving radio network node or a neighbouring radio network node wherein the service area may be referred to as a secondary cell or neighbouring cell, and the secondary radio network node may communicate with the UE in form of DL transmissions to the UE and UL transmissions from the UE. It should be noted that a service area may be denoted as cell, beam, beam group or similar to define an area of radio coverage.

The wireless communications network 1 further comprises a control network node 15. The control network node 15 may be configured to control radio resources or configuration in the wireless communications network 1.

In Long-Term Evolution (LTE) communication systems, advanced frequency reuse techniques and interference mitigation mechanisms are used to have better performance of the system. However, capacities of the licensed bands are not yet fulfilling quite the market demand and therefore one solution is spectrum sharing and data augmentation with/into unlicensed bands to boost the system performance.

The Listen-Before-Talk (LBT) mechanism is a method of sharing frequency channels in an unlicensed frequency band, which is used by each user to make a channel assessment before transmitting on the shared frequency channels, based on Energy Detection (ED) technique. If the channel assessment shows that energy is below the ED threshold, then the channel has lower interference level and considered to be free for the transmission. Therefore, probability of successful transmission is increased.

According to embodiments herein the control network node 15, for handling a radio resource e.g. allocating access parameters and the like, in a frequency band, receives an indication related to a performance of the first radio network node 12 or a performance of a user equipment served by the first radio network node 12, e.g. the UE 10. The indication may e.g. indicate an interference from one or more other radio network nodes such as the second radio network node 13. The control network node 15 then triggers, based on the indication, a performance adjustment related to at least one radio network node of the number of radio network nodes or to the first radio network node 12. E.g. the control network node 15 may control the second radio network node 13 to back-off from accessing the channel, shut off transmission of the second radio network node 13 or may order increase of transmit power at the first radio network node 12. Embodiments herein may thus e.g. control the number of the radio network nodes in one or more wireless communication networks which are allowed to access the channel simultaneously in e.g. a given interval of time. This allows an access mechanism such as the LBT mechanism to work more efficiently with less retries and thus increases utilization and performance of the one or more wireless communication networks such as one or more LAA networks. Embodiments enable ways of regulating and assigning spectrum resources based on the introduction of e.g. prioritization of different radio network nodes sharing the spectrum under the control of the control network node 15, such as a Spectrum Assignment System (SAS) node, that allocates channels among the different radio network nodes while avoiding interference.

Embodiments herein thus increase performance of the wireless communication network(s) and have one or more of the following advantages: resource sharing capabilities between the transmissions of LAA communication systems even in co-channel scenario; a mutual interference is reduced and hence utilization is improved by resource partitioning, channel reuse and switching on-off radio network nodes, between two communication systems but only when needed; allowing to adapt transmission period of BSs to their actual load improving flexibility and efficiency in resource utilization; introducing a coordination mechanism between the BSs through the SAS introducing radio network nodes prioritization based on the actual channel utilization by exploiting the CBRS framework specified by FCC for 3.5 GHz CBRS band; allowing efficient coexistence between radio network nodes of different power while maintaining the same LBT threshold; allowing to control the interference in a single LAA network also, exploiting information on interference experienced by UEs and controlling the beam direction of close radio network nodes.

Figure 3:
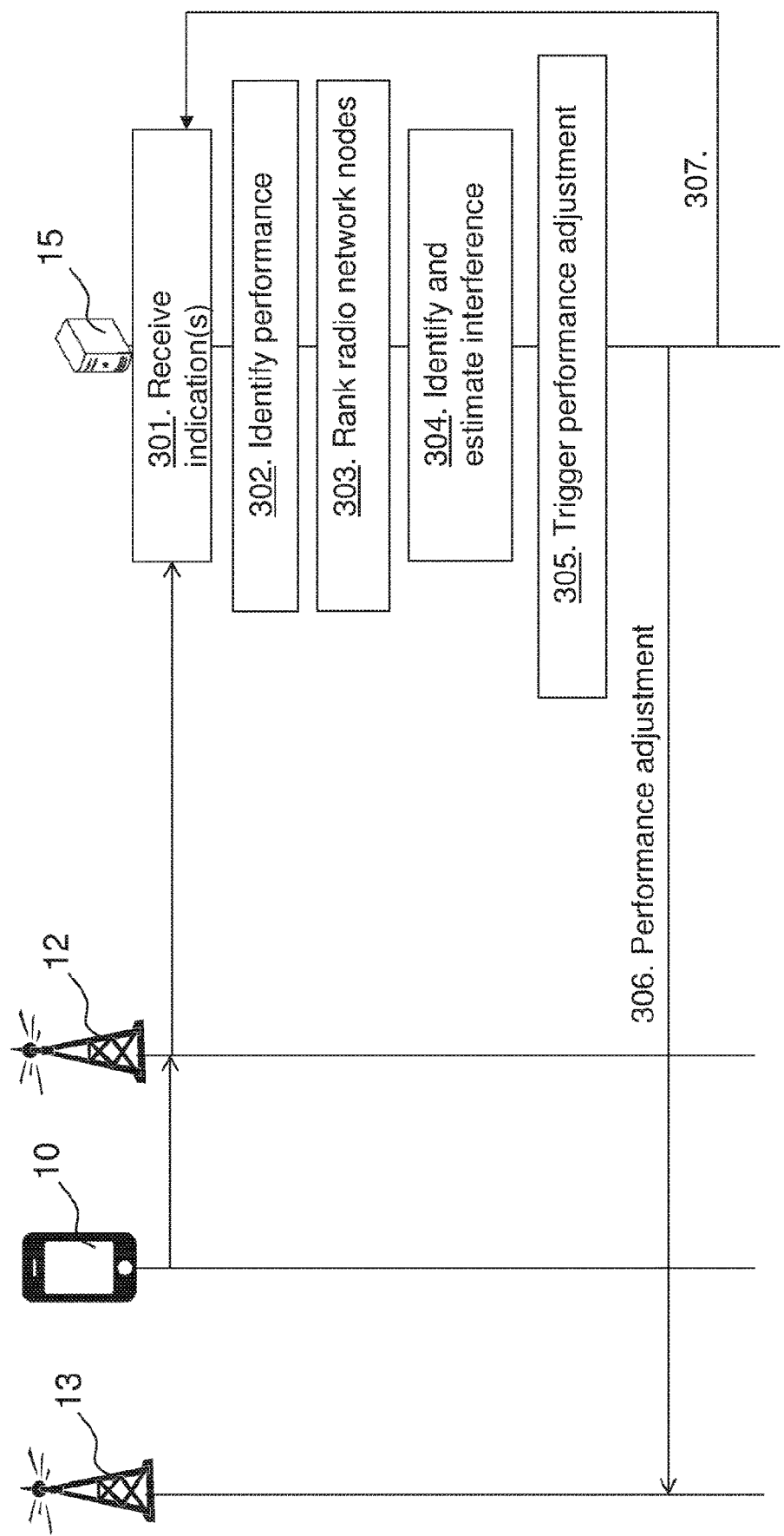
FIG. 3 is a combined signalling scheme and flowchart according to embodiments herein.

FIG. 3 is a combined signalling scheme and flowchart according to embodiments herein.

Action 301. The control network node 15 receives or retrieves one or more indications indicating an issue relating to performance of the first radio network node 12 and/or other radio network nodes.

Action 302. The control network node 15, such as a central controller in SAS entity, may periodically identify or determine performance of cells or radio network nodes on basis of received or retrieved indication(s) of performance of the radio network nodes such as traffic loads of the different radio network nodes.

Action 303. The control network node 15 may then rank or prioritize the radio network nodes, such as the first and second radio network node, sharing the same channel based on the retrieved or requested data, e.g. received indication(s) of performance of the radio network nodes and/or therefrom identified or determined performance.

Action 304. The control network node 15 may then identify radio network nodes (ranked or prioritized radio network nodes they are listening to) and may estimate interference towards radio network nodes and UEs served by such radio network nodes. E.g. the control network node 15 may be aware of positions and max transmission power of radio network nodes.

Action 305. The control network node 15 then triggers the performance adjustment of at least one of the radio network nodes, such as one or more neighbouring radio network nodes and/or the first radio network node 12, based on the indication e.g. the control network node 15 may initiate an interference mitigation scheme at one radio network node. The interference mitigation scheme may comprise one or more of the following: select one or more radio network nodes of least determined priority and determine not to allow the selected one or more radio network nodes to access the channel, i.e. to share the channel, for a certain time period and inform the selected radio network node to stop using the channel or to move to another channel; select or determine one or more radio network nodes which need to reduce effect on performance in the wireless communication network to manageable level and inform the selected one or more radio network nodes about a set max transmit power level they are allowed to operate with; evaluate possibility to reduce transmit power first and if interference does not improve due to transmit power reduction then inform the one or more radio network nodes to turn off transmission on that channel.

Action 306. The control network node 15 may transmit an indication to a radio network node such as e.g. the second radio network node 13, e.g. inform one or more radio network nodes about an adjustment of the performance e.g. action they need to perform. The control network node 15 may transmit to the second radio network node 13: a request to reduce the power of transmission; a request to not use the channel i.e. stop transmission; a request to move to another channel e.g. channel Y; and/or a request to change beam directions. The control network node 15 may alternatively or additionally transmit to the first radio network node 12 a request to e.g. increase the power of transmission.

Action 307. After a time T or upon the reception of expiration of time threshold notification, e.g. expiration of a timer, the control network node may go back to action 301.

Figure 4:
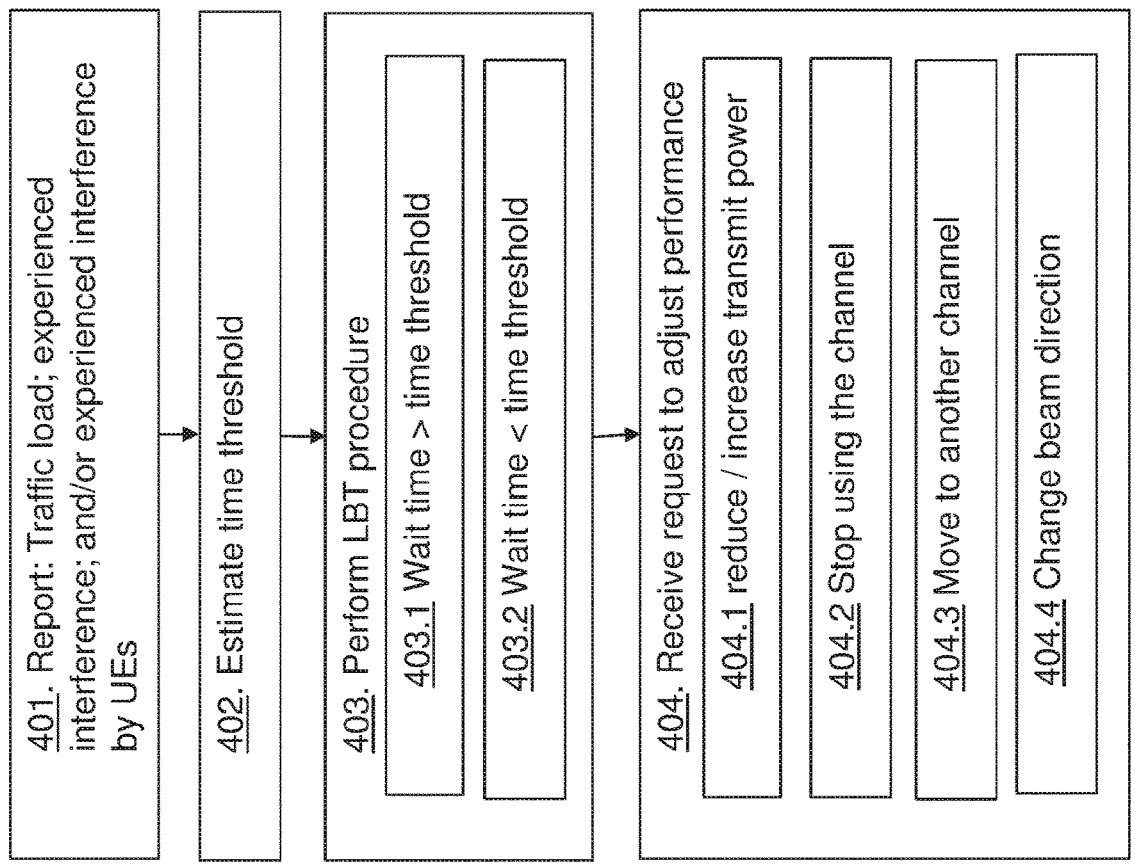
FIG. 4 is a flowchart depicting a method performed by a radio network node according to embodiments herein.

In embodiments herein, see action 301 above, the first radio network node 12 reports i.e. transmits indications to the control network node 15 relating to the performance of the first radio network node 12. Each radio network node such as the first radio network node 12 sharing the channel may e.g. perform one or more of the following shown in FIG. 4:

401. The first radio network node 12 may report periodically to the control network node 15:
    a. Traffic load and/or cell utilization
    b. experienced interference (listened to signals from neighbors) (if this information is available)
    c. experienced interference by UEs (reported from UEs to corresponding radio network nodes) (if this information is available; for instance it is not available at radio network node start-up).
  402. The first radio network node 12 may estimate a maximum period of time (time threshold) to wait to listen to the channel (comparing actual cell utilization and traffic load).
  403. If it is allowed by the control network node 15 (i.e. if it has not received a request to stop transmission/not to use the channel) the first radio network node 12 may start performing LBT procedure steps to access the channel.
    Step 403.1, if the first radio network node 12 waits for a time longer than the time threshold evaluated at step 402 it informs the control network node 15 with one or more indications indicating that the first radio network node 12 is interfered i.e. does not gain access within a time interval set by the time threshold. That is, the first radio network node 12 may evaluate target performance and send the indication to the control network node 15.
    Step 403.2, if the first radio network node 12 waits for a time lower than or equal to the time threshold evaluated at step 402 it accesses the channel and after its transmission is completed the first radio network node 12 updates its cell utilization and goes to step 401 if no messages are received from the control network node 15.
  404. The first radio network node 12 may receive a request from the control network node 15 to adjust performance e.g. by reducing or increasing transmission power, stop using a channel, moving to another channel and/or changing beam direction, and may in response, depending on the request:

Step 404.1, reduce or increase transmission power and go to step 401; and/or Step 404.2, stop using the channel and go to step 401; and/or Step 404.3, move to another channel and perform step 401 with regard to the another channel; and/or Step 404.4, change beam direction and perform step 401.

It is herein disclosed a way of regulating and assigning radio resources such as spectrum based on the introduction of radio network nodes with e.g. different prioritization sharing the spectrum under the control of the control network node 15 such as a Spectrum Assignment System (SAS) entity allocating channels among the radio network nodes while avoiding interference.

Embodiments herein may be for co-channel deployed systems, sharing the same frequency band and e.g. a same channel, to be able to avoid causing mutual interference by introducing a resource sharing method. This includes the following solutions which are based on reducing the waiting time for the radio network nodes after a certain time threshold, defining suitable schemes for the radio network nodes and the central control system:
  a. Radio network nodes who are listening while not allowed to transmit because of the busy channel (at least energy level of one of the received signals from the neighboring radio network nodes on the channel is higher than the LBT threshold) for a period of time longer than a certain time threshold reports to a central control system their status of received interference. The central control system can be the SAS entity, for instance.
  b. The central control system, that is the control network node 15, may need to prioritize the neighboring radio network nodes based on the notification of received interference. This can be done by monitoring the cell utilization of neighboring radio network nodes such that: the higher cell utilization, the higher traffic, and the higher priority.
  c. The central control node 15 may stop the waiting time before transmission for the listening radio network nodes by making either of the following actions on the basis of the neighboring radio network node or BSs priorities:
    i. Alternative 1 (without reducing TX power of the neighboring radio network node):
      1. For the listening radio network nodes with high traffic, the control network node 15 may stop transmission for some of the neighboring radio network nodes for a certain period of time (can be chosen randomly). The number of radio network nodes and the period of stopping time can be decided and triggered by the control network node 15.
      2. Changing beam direction: For the cells where a set of UEs experience high level interference, for those that the listening radio network nodes report UE interference levels and locations to the control network node 15, the control network node 15 may determine forbidden beam directions for aggressor radio network nodes, could be an added new functionality in the control network node 15. In fact, this action can be used, for instance, if the neighboring radio network nodes have the same priorities and the reduction of power cannot be performed.
      3. Re-assigns channel in a different way, e.g. to be shared by a different set of radio network nodes.
    ii. Alternative 2 (by changing the transmission power): Reduce the power in the low priority neighboring radio network nodes (where the level of power reduction again is determined and triggered by the control network node 15.

As mentioned in the algorithm above in FIG. 3, during the normal LBT operation, the control network node 15 may periodically identify the most loaded cells based on information on BSs traffic loads in the network. Then control network node 15 may assign the operating radio network nodes a rank or priority based on their cell utilization which is a measure of the traffic served by that radio network node. The higher the utilization, the better or higher the rank. After this step, identification of the neighbors of each radio network node (ranked base stations they are listening to) and their interference levels is performed. The interference experienced by radio network nodes (received signals from neighbors) and interference experienced by UEs (reported from UEs to corresponding radio network nodes) may be reported periodically to the control network node 15 by the radio network nodes. After this step, the radio network nodes may estimate a maximum period (time threshold) they can wait to listen on the channel (comparing actual cell utilization and traffic load) and when such time threshold expires they may inform the control network node 15. Finally, the control network node 15 may apply interference mitigation scheme upon a reception of a time threshold expiration message.

Embodiments herein allow resource sharing capabilities between the transmissions of e.g. two LAA communication systems even in co-channel scenario.

Since the performance may be adjusted the mutual interference may be reduced and hence utilization may be improved by radio resource partitioning, channel reuse and switching on-off radio network node, between the two systems but only when needed.

The performance adjustment may comprise to adapt transmission period of radio network nodes to their actual load improving flexibility and efficiency in resource utilization. The method may introduce a coordination mechanism between the radio network nodes through the control network node introducing prioritization of radio network nodes based on the actual channel utilization by exploiting the CBRS framework specified by FCC for 3.5 GHz CBRS band. The method may allow efficient coexistence between radio network nodes of different transmit power while maintaining a same LBT threshold. The methods herein may further allow to control the interference in a single LAA network also, exploiting information on interference experienced by UEs and controlling e.g. the beam direction of close radio network nodes, e.g. being within a range of one another.

Figure 5:
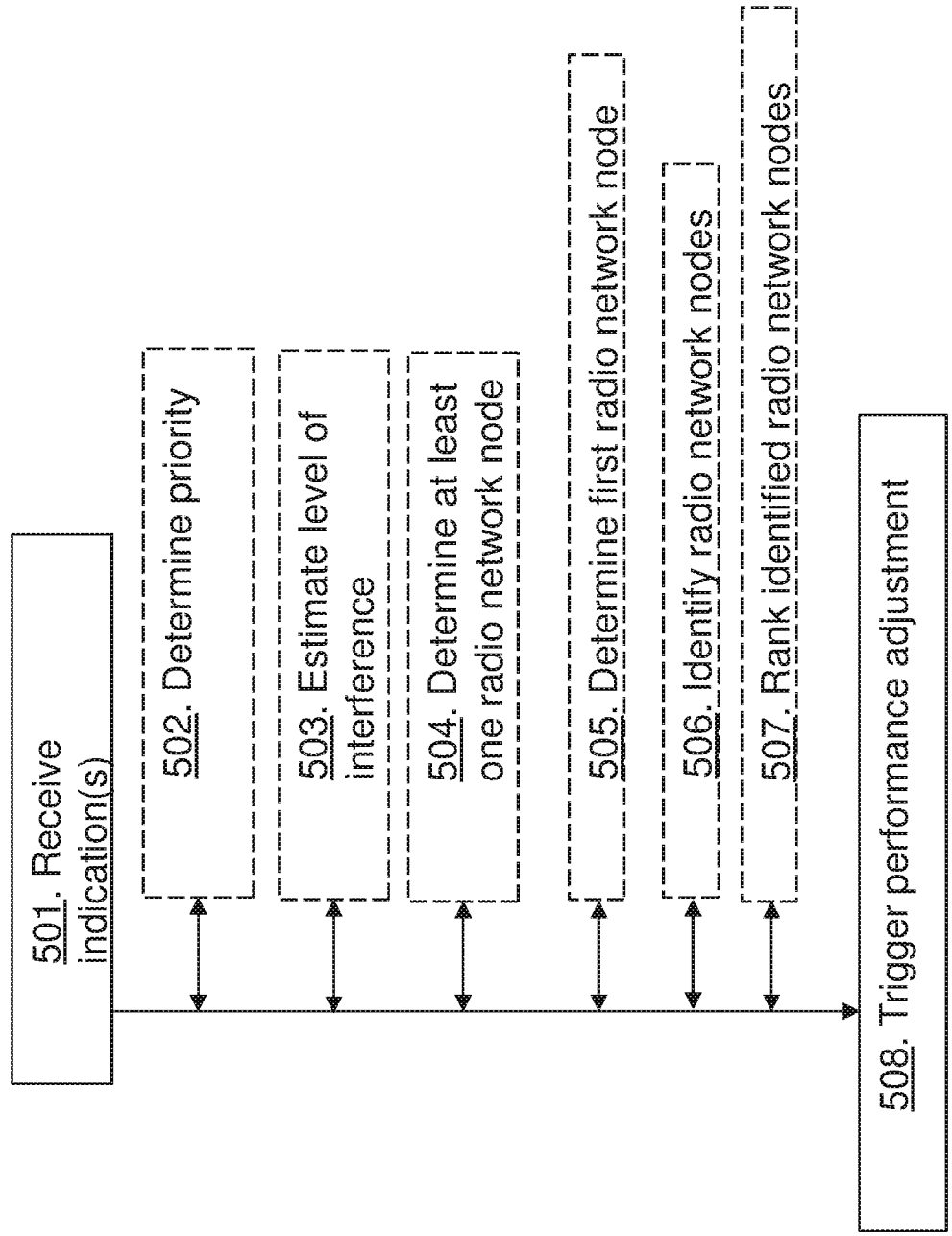
FIG. 5 is a flowchart depicting a method performed by a control network node according to embodiments herein.

The method actions performed by the control network node 15 for handling the (one or more) radio resources, e.g. handling communication such as enabling access to a channel or a radio resource, in a frequency band according to embodiments herein will now be described with reference to a flowchart depicted in FIG. 5. The actions do not have to be taken in the order stated below, but may be taken in any suitable order. Actions performed in some, but not necessarily all, embodiments are marked with dashed boxes. The radio resource may comprise a radio channel, and/or a set of transmission time slots. The frequency band may be an unlicensed frequency band e.g. a frequency band where access is controlled using LBT. Thus, the radio resource may be a radio resource located in the unlicensed frequency band.

Action 501. The control network node 15 receives an indication related to a performance of a first radio network node, or a performance of user equipment served by the first radio network node 12. The indication may indicate an interference experienced by the first radio network node 12 from one or more radio network nodes, e.g. neighbouring radio network nodes. The one or more radio network nodes may comprise at least one radio network node of a number of radio network nodes controlled by the control network node 15. The indication may indicate a performance change of the first radio network node, e.g. a deterioration or improvement of its performance. The indication may comprise information related to or indicating a waiting time experienced by the first radio network node before accessing a channel or a radio resource of the frequency band.

Action 502. The control network node 15 may determine a priority of the at least one radio network node and the first radio network node relative to one another. The determined priority may be taken into account when triggering the performance adjustment, see action 508.

Action 503. The control network node 15 may estimate a level of interference towards, or experienced by, the first radio network node and/or by user equipment served by the first radio network node 12. The estimated level of interference may be taken into account when triggering the performance adjustment, see action 508.

Action 504. The control network node 15 may determine, based on a load, a priority and/or an interference related to the at least one radio network node or the user equipment served by the at least one radio network node, that the at least one radio network node is to perform the performance adjustment.

Action 505. The control network node 15 may determine, based on a load, a priority and/or service level agreement, that the first radio network node 12 is to perform the performance adjustment.

Action 506. The control network node 15 may identify the at least one radio network node and the first radio network node using the radio resource in the frequency band.

Action 507. The control network node 15 may rank, or prioritize, the identified radio network nodes, e.g. the at least one radio network node and the first radio network node 12, based on a level of traffic load and/or class of service of each respective radio network node.

Action 508. The control network node 15 triggers the performance adjustment related to at least one radio network node of a number of radio network nodes, or to the first radio network node, based on the indication. E.g. the performance adjustment of the one or more neighbouring radio network nodes or the first radio network node 12, or of at least one user equipment served by one radio network node. The radio resource may be a shared radio resource that is used by the at least one radio network node and the first radio network node in communication with user equipments served by the at least one radio network node and the first radio network node respectively. The at least one radio network node of the number of radio network nodes and the first radio network node may be nodes of same or different wireless communications networks. The frequency band may be an unlicensed frequency band. Thus, the radio resource may be located in the unlicensed frequency band. Triggering the performance adjustment may comprise dynamically allocating radio resources to the at least one of the number of radio network nodes or to the first radio network node based on the indication. The performance adjustment may comprise increasing or reducing transmission power related to the at least one radio network node of the number of radio network nodes or to the first radio network node. The transmission power related to the at least one radio network node of the number of radio network nodes or to the first radio network node may be transmission power used in communication between the respective radio network node and a UE served by the radio network node, i.e. it may be transmit power used by the radio network node and/or transmit power used by the user equipment in said communication. Triggering the performance adjustment may comprise stopping the at least one of the number of radio network nodes or the first radio network node from using a channel, e.g. a radio resource, in the frequency band and/or ordering the at least one of the number of radio network nodes or the first radio network node to use another channel or another radio resource. Triggering the performance adjustment may comprise reducing or increasing the number of radio network nodes sharing the same radio resources, e.g. the radio resource in the frequency band. Triggering the performance adjustment may be performed taking into account the determined priority of the at least one radio network node and the first radio network node relative to one another. Triggering the performance adjustment may be performed taking into account the estimated level of interference. The performance adjustment may depend on the load, the priority or service level agreement of the first radio network node 12 or of the user equipment served by the first radio network node, and/or on the load, the priority and/or interference related to the at least one radio network node or the user equipment served by the at least one radio network node. The performance adjustment may impact a waiting time experienced by the first radio network node or the user equipment served by the first radio network node for accessing the radio resource.

The method of controlling access to a channel shared by a number of systems using LBT mechanism is herein disclosed. It allows to prioritize radio network nodes among such systems based on different parameters e.g. traffic load of systems sharing the channel, number of neighboring systems transmitting, transmit (TX) power of neighboring systems, interference experienced by UEs, and may exploit a SAS like framework to control the power of such systems and/or the number of systems sharing the channel in a certain time interval.

That can drive the control network node 15 to reassign the channels to radio network nodes forced to stop transmission or to reduce power. Such prioritization mechanisms, differently from the 3GGP one, based on the possibility to assign different back-off windows to systems with different priority, allows dynamically adjusting transmission window and transmission power instead, based on actual load and interference distribution in a given deployment scenario.

Figure 6:
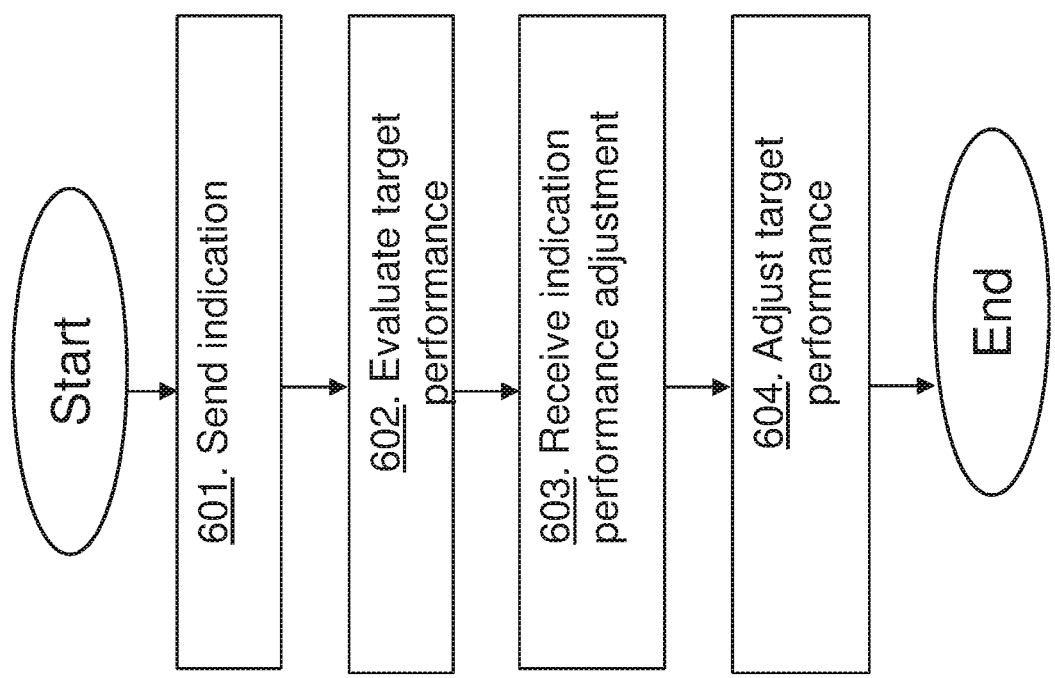
FIG. 6 is a flowchart depicting a method performed by a first radio network node according to embodiments herein.

The method actions performed by the first radio network node 12 for handling the (one or more) radio resources, e.g. handling communication such as gaining access to a channel or a radio resource, in the frequency band according to embodiments herein will now be described with reference to a flowchart depicted in FIG. 6. The actions do not have to be taken in the order stated below, but may be taken in any suitable order. The radio resource may comprise a radio channel, and/or a set of transmission time slots. The frequency band may be an unlicensed frequency band e.g. a frequency band using an LBT mechanism. Thus, the radio resource may be a radio resource located in the unlicensed frequency band.

Action 601. The first radio network node 12 sends the indication related to the performance of the first radio network node, or the performance of user equipment served by the first radio network node.

Action 602. The first radio network node 12 further evaluates a target performance based on a load, a priority and/or service level agreement.

Action 603. The first radio network node 12 receives an indication of a performance adjustment related to the performance of the first radio network node, or the performance of the user equipment served by the first radio network node.

Action 604. The first radio network node 12 then adjusts the target performance based on the received indication of the performance adjustment. The performance adjustment may depend on the load, the priority or service level agreement of the first radio network node 12 and may impact a waiting time experienced by the first radio network node for accessing the radio resource.

Figure 7:
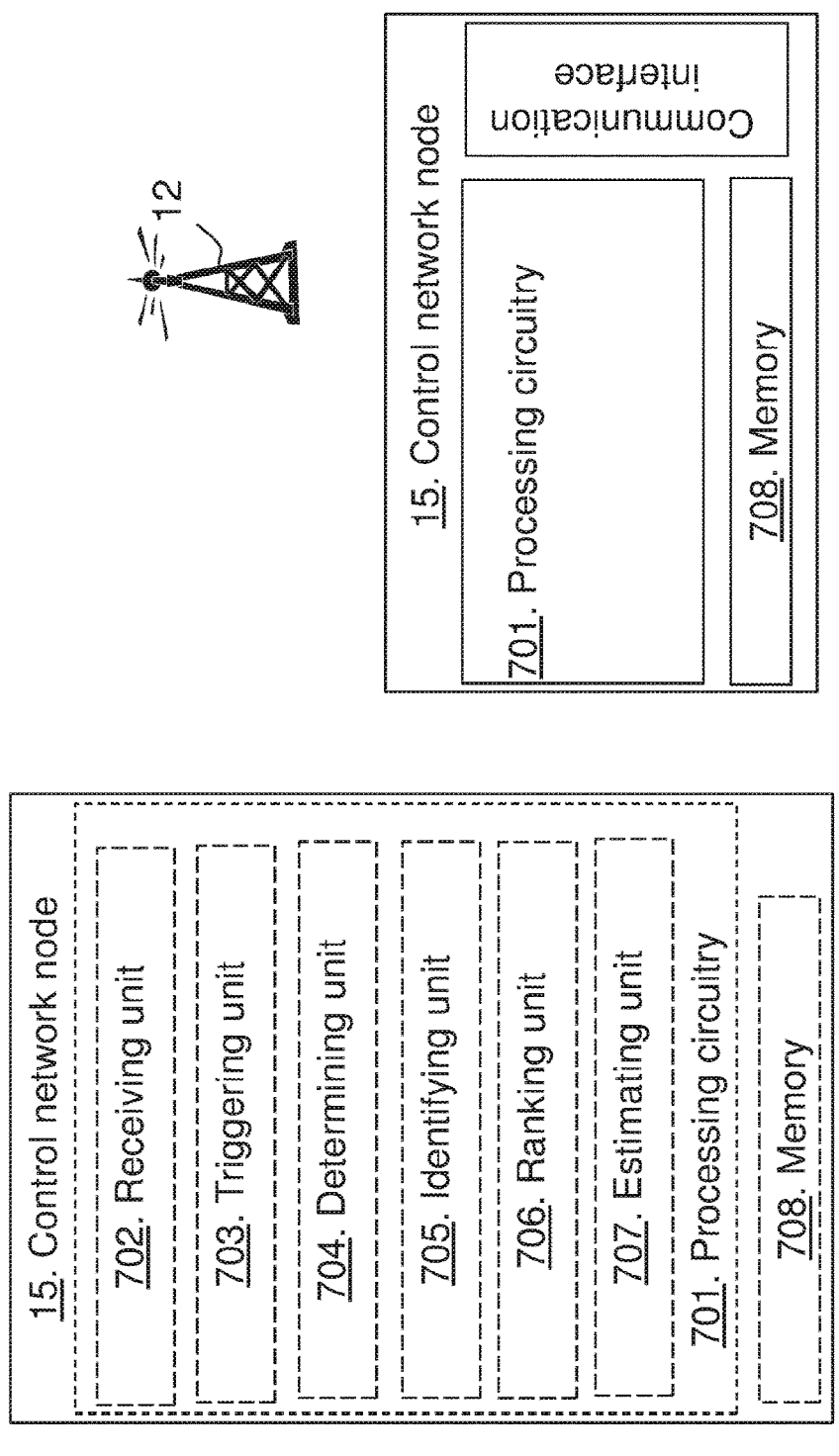
FIG. 7 is a block diagram depicting a control network node according to embodiments herein.

FIG. 7 is a block diagram depicting the control network node 15 for handling the radio resource in the wireless communication network 1 according to embodiments herein. The radio resource may comprise a radio channel, and/or a set of transmission time slots.

The control network node 15 may comprise processing circuitry 701, e.g. one or more processors, configured to perform the methods herein.

The control network node 15 may comprise a receiving unit 702. The control network node 15, the processing circuitry 701, and/or the receiving unit 702 is configured to receive the indication related to the performance of the first radio network node, or the performance of the user equipment served by the first radio network node. The indication may indicate the interference experienced by the first radio network node 12 from one or more radio network nodes and/or the indication may indicate the performance change of the first radio network node 12. The indication may comprise information related to or indicating the waiting time experienced by the first radio network node before accessing the channel of the frequency band.

The control network node 15 may comprise a triggering unit 703. The control network node 15, the processing circuitry 701, and/or the triggering unit 703 is configured to trigger the performance adjustment related to the at least one radio network node of the number of radio network nodes, or to the first radio network node, based on the indication. The radio resource may be a shared radio resource that is used by the at least one radio network node and the first radio network node in communication with user equipments served by the at least one radio network node and the first radio network node respectively. The frequency band may be an unlicensed frequency band. The control network node 15, the processing circuitry 701, and/or the triggering unit 703 may be configured to trigger the performance adjustment by dynamically allocating one or more radio resources to the at least one radio network node of the number of radio network nodes or to the first radio network node based on the indication. The performance adjustment may comprise increasing or reducing transmission power related to the at least one radio network node of the number of radio network nodes or to the first radio network node. The control network node 15, the processing circuitry 701, and/or the triggering unit 703 may be configured to trigger the performance adjustment by stopping the at least one of the number of radio network nodes or the first radio network node from using a channel in the frequency band and/or by ordering the at least one of the number of radio network nodes or the first radio network node to use another channel or another radio resource. The control network node 15, the processing circuitry 701, and/or the triggering unit 703 may be configured to trigger the performance adjustment by reducing or increasing the number of radio network nodes sharing the same radio resource, e.g. the radio resource in the frequency band.

The control network node 15 may comprise a determining unit 704. The control network node 15, the processing circuitry 701, and/or the determining unit 704 may be configured to determine, based on a load, a priority and/or service level agreement, that the first radio network node 12 is to perform the performance adjustment. The control network node 15, the processing circuitry 701, and/or the determining unit 704 may be configured to determine, based on a load, a priority and/or an interference related to the at least one radio network node or the user equipment served by the at least one radio network node, that the at least one radio network node of the number of radio network nodes is to perform the performance adjustment. The control network node 15, the processing circuitry 701, and/or the determining unit 704 may be configured to determine the priority of the at least one radio network node of the number of radio network nodes and the first radio network node 12 relative to one another; and the control network node 15, the processing circuitry 701, and/or the triggering unit 703 may be configured to take the determined priority into account when triggering the performance adjustment.

The control network node 15 may comprise an identifying unit 705. The control network node 15, the processing circuitry 701, and/or the identifying unit 705 may be configured to identify the at least one radio network node of the number of radio network nodes and the first radio network node using the radio resource in the frequency band.

The control network node 15 may comprise a ranking unit 706. The control network node 15, the processing circuitry 701, and/or the ranking unit 706 may be configured to rank, or prioritize, the identified radio network nodes, e.g. the at least one radio network node and the first radio network node 12, based on the level of traffic load and/or class of service of each respective radio network node.

The control network node 15 may comprise an estimating unit 707. The control network node 15, the processing circuitry 701, and/or the estimating unit 707 may be configured to estimate the level of interference towards, or experienced by, the first radio network node and/or by user equipment served by the first radio network node; and the control network node 15, the processing circuitry 701, and/or the triggering unit 703 may be configured to take the estimated level of interference into account when triggering the performance adjustment.

The control network node 15 may further comprise a memory 708. The memory 708 may comprise one or more units to be used to store data on, such as interference indication, indications, transmission power levels of different radio network nodes, LBT parameters of different radio network nodes, data packets, events and applications to perform the methods disclosed herein when being executed, and similar. Furthermore, the control network node 15 may comprise a communication interface such as an interface comprising a transmitter, a receiver and/or a transceiver.

The methods according to the embodiments described herein for the control network node 15 may respectively be implemented by means of e.g. a computer program product 709 or a computer program, comprising instructions, i.e., software code portions, which, when executed on at least one processor, cause the at least one processor to carry out the actions described herein, as performed by the control network node 15. The computer program product 709 may be stored on a computer-readable storage medium 710, e.g.

a disc, a universal serial bus (USB) stick or similar. The computer-readable storage medium 710, having stored thereon the computer program product, may comprise the instructions which, when executed on at least one processor, cause the at least one processor to carry out the actions described herein, as performed by the control network node 15. In some embodiments, the computer-readable storage medium may be a transitory or a non-transitory computer-readable storage medium. Thus, embodiments herein may disclose a control network node 15 for handling the radio resource in a wireless communications network, wherein the control network node 15 comprises processing circuitry and a memory, said memory comprising instructions executable by said processing circuitry whereby said control network node 15 is operative to perform any of the methods herein.

Figure 8:
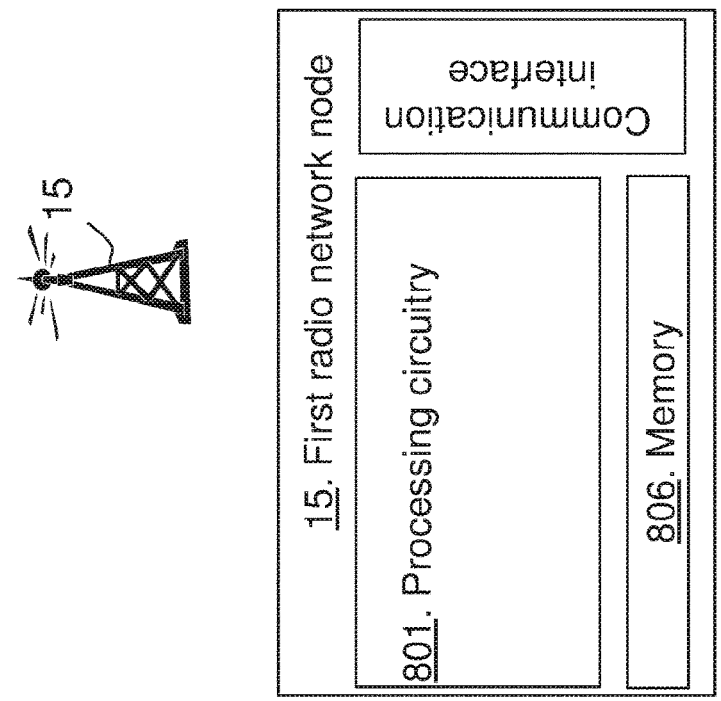
FIG. 8 is a block diagram depicting a first radio network node according to embodiments herein.
Figure 8:
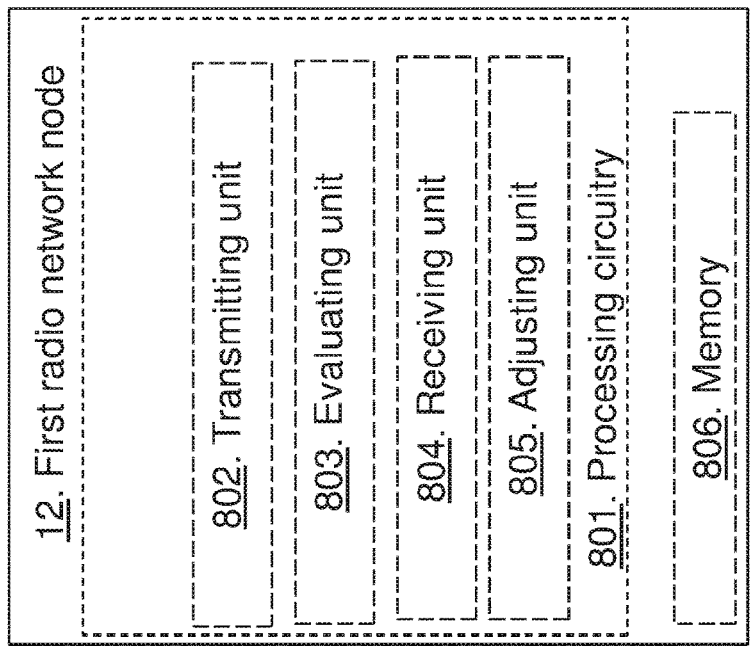
Figure 8:
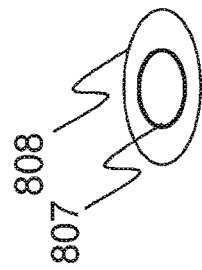

FIG. 8 is a block diagram depicting the first radio network node 12 for using one or more radio resources in the frequency band according to embodiments herein.

The first radio network node 12 may comprise processing circuitry 801, e.g. one or more processors, configured to perform the methods herein.

The first radio network node 12 may comprise a transmitting unit 802. The radio network node 12, the processing circuitry 801 and/or the transmitting unit 802 is configured to send the indication related to the performance of the first radio network node, or the performance of the user equipment served by the first radio network node.

The first radio network node 12 may comprise an evaluating unit 803. The radio network node 12, the processing circuitry 801 and/or the evaluating unit 803 is configured to evaluate the target performance based on the load, the priority and/or the service level agreement.

The first radio network node 12 may comprise a receiving unit 804. The radio network node 12, the processing circuitry 801 and/or the receiving unit 804 is configured to receive the indication of the performance adjustment related to the performance of the first radio network node, or the performance of the user equipment served by the first radio network node.

The first radio network node 12 may comprise an adjusting unit 805. The radio network node 12, the processing circuitry 801 and/or the adjusting unit 805 is configured to adjust the target performance based on the received indication of the performance adjustment.

The first radio network node 12 may further comprise a memory 806. The memory 806 may comprise one or more units to be used to store data on, such as data packets, indications, interference, target performance, performance adjustments, LBT parameters, events and applications to perform the methods disclosed herein when being executed, and similar. Furthermore, the first radio network node 12 may comprise a communication interface such as an interface comprising a transmitter, a receiver and/or a transceiver.

The methods according to the embodiments described herein for the first radio network node 12 may respectively be implemented by means of e.g. a computer program product 807 or a computer program, comprising instructions, i.e., software code portions, which, when executed on at least one processor, cause the at least one processor to carry out the actions described herein, as performed by the first radio network node 12. The computer program product 807 may be stored on a computer-readable storage medium 808, e.g. a disc, a USB stick or similar. The computer-readable storage medium 808, having stored thereon the computer program product, may comprise the instructions which, when executed on at least one processor, cause the at least one processor to carry out the actions described herein, as performed by the first radio network node 12. In some embodiments, the computer-readable storage medium may be a transitory or a non-transitory computer-readable storage medium. Thus, embodiments herein may disclose a radio network node for using one or more radio resources in the frequency band in a wireless communications network, wherein the first radio network node comprises processing circuitry and a memory, said memory comprising instructions executable by said processing circuitry whereby said first radio network node is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipment (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

It will be readily understood by those familiar with communications design, that functions, means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Embodments herein may disclose a network node for using radio resources in a frequency band, wherein the radio resources may be shared with other network nodes, configured to: send an indication related to its performance or a performance of served user equipment; evaluate target performance based on load, a priority and/or service level agreement; and receive and perform the performance adjustment.

A method is herein disclosed performed by the control network node for handling radio resources in the frequency band, wherein the number of radio network nodes and the number of user equipment served by the radio network nodes may share or not share the radio resources in the frequency band. The control network node 15 may receive the indication related to the performance of the radio network nodes and/or of user equipment served by each radio nodes, and determine the at least one radio network node and/or the first radio network node, which need a performance adjustment. The control network node may then trigger a performance adjustment of the at least one of the number of radio network nodes or the first radio network node (or of at least one user equipment served by the respective radio network node). The control network node 15 may compare the received indication (of performance) with an average performance of each radio network node (and/or served user equipment). The control network node 15 may determine a target performance of the first radio network node (and/or user equipment) based on load, priority and/or service level agreement, receive the indication of target performance of the first radio network node and compare the received indication of performance with the target performance. The performance adjustment may comprise: increasing or decreasing the transmission power of at least one radio network node or user equipment served by the radio network node and/or increasing or decreasing waiting time to access the radio resources of at least one of the radio network nodes (or user equipment served by the at least one radio network node) and/or increasing or decreasing the number of radio network nodes sharing the same radio resource e.g. changing the assigned radio resources of at least one radio network node.

Figure 9:
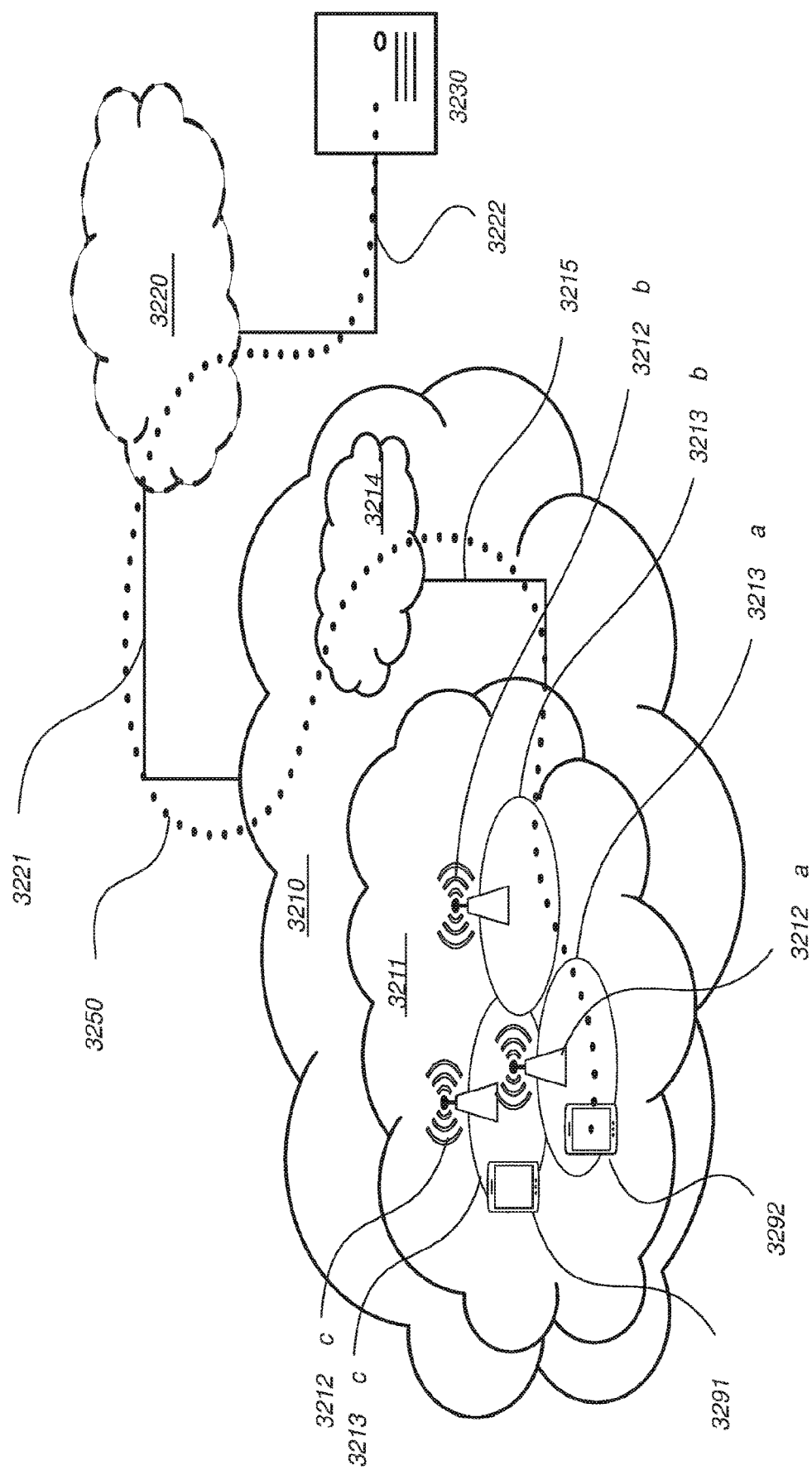
FIG. 9 schematically illustrates a telecommunication network connected via an intermediate network to a host computer.

FIG. 9 shows a Telecommunication network connected via an intermediate network to a host computer in accordance with some embodiments. With reference to FIG. 9, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 10:
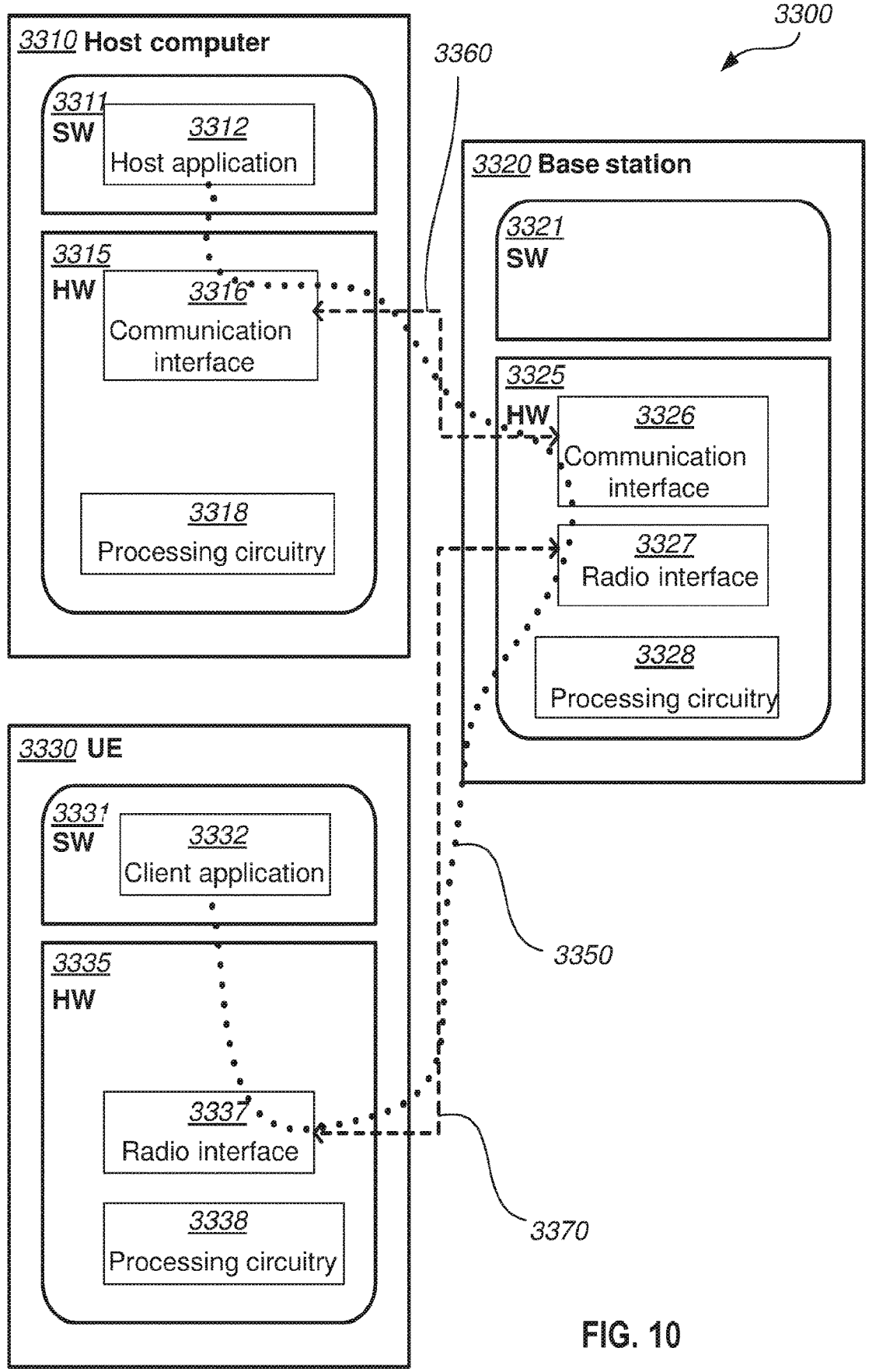
FIG. 10 is a generalized block diagram of a host computer communicating via a base station with a user equipment over a partially wireless connection.

FIG. 10 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 10. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 10) served by base station 3320. Communication interface 3326 may be configured to facilitate connection 3360 to host computer 3310. Connection 3360 may be direct or it may pass through a core network (not shown in FIG. 10) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 10 may be similar or identical to host computer 3230, one of base stations 3212a, 3212b, 3212c and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to enhance the fairness of channel accesses. Embodiments herein may e.g. enable the control network node to more efficiently control the performance of the wireless communication network by configuring the radio network nodes according to embodiments herein, and to more efficiently handle radio resources.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 11, 12:
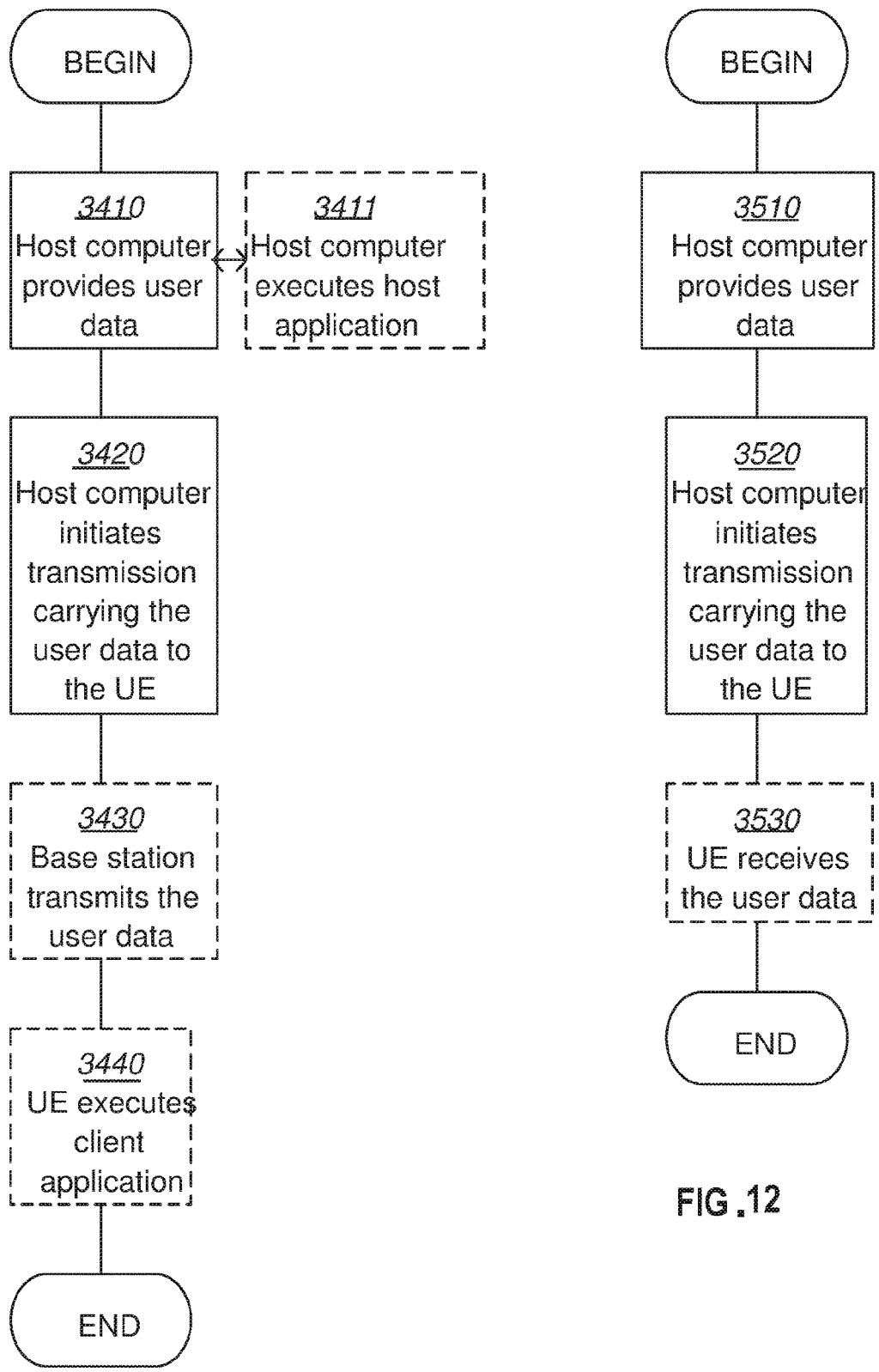

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 13 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 14 show methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 14 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| BS | Base Station |
| CCA | Clear Channel Assessment |
| CBRS | Citizens Broadband Radio Service |
| eCFR | electronic Code of Federal Regulations |
| FCC | Federal Communication Commission |
| EIRP | Effective Isotropic Radiated Power |
| LAA | License Assisted Access |
| LBT | Listen Before Talk |
| LTE | Long-Term Evolution |

The invention claimed is:

1. A method performed by a control network node for handling a radio resource in a frequency band, the method comprising:
receiving an indication related to a performance of a first radio network node, or a performance of user equipment served by the first radio network node;
triggering a performance adjustment related to at least one radio network node of a number of radio network nodes, or to the first radio network node, based on the indication; and
determining a priority of the at least one radio network node and the first radio network node relative to one another, the priority being taken into account by the control network node when triggering the performance adjustment.

2. The method according to claim 1, wherein the performance adjustment comprises one of increasing and reducing transmission power related to the at least one radio network node or to the first radio network node.

3. A method performed by a first radio network node for using one or more radio resources in a frequency band, comprising:
sending an indication related to a performance of the first radio network node, or a performance of user equipment served by the first radio network node;
evaluating a target performance based on a priority of at least one radio network node and the first radio network node relative to one another, the priority being taken into account by a control network node when triggering a performance adjustment;
receiving an indication of a performance adjustment related to the performance of the first radio network node, or the performance of the user equipment served by the first radio network node; and
adjusting the target performance based on the received indication of the performance adjustment.

4. A control network node for handling a radio resource in a frequency band, the control network node being configured to:
- receive an indication related to a performance of a first radio network node, or a performance of user equipment served by the first radio network node;
- trigger a performance adjustment related to at least one radio network node of a number of radio network nodes, or to the first radio network node, based on the indication; and
- determine a priority of the at least one radio network node and the first radio network node relative to one another, the priority being taken into account by the control network node when triggering the performance adjustment.

5. The control network node according to claim 4, wherein the radio resource is a shared radio resource that is used by the at least one radio network node and the first radio network node in communication with user equipments served by the at least one radio network node and the first radio network node respectively.

6. The control network node according to claim 4, wherein the frequency band is an unlicensed frequency band.

7. The control network node according to claim 4, wherein the indication indicates an interference from one or more radio network nodes.

8. The control network node according to claim 4, wherein the indication indicates a performance change of the first radio network node.

9. The control network node according to claim 4, wherein the control network node is further configured to:
- determine, based on at least one from a group consisting of a load, a priority and a service level agreement, that the first radio network node is to perform the performance adjustment.

10. The control network node according to claim 4, wherein the control network node is further configured to:
- determine, based on at least one from a group consisting of a load, a priority and an interference related to the at least one radio network node or the user equipment served by the at least one radio network node, that the at least one radio network node is to perform the performance adjustment.

11. The control network node according to claim 4, wherein the control network node is further configured to:
- identify the at least one radio network node and the first radio network node using the radio resource in the frequency band; and
- rank the identified radio network nodes based on a level of traffic load and/or class of service of each respective radio network node.

12. The control network node according to claim 4, wherein the control network node is configured to trigger the performance adjustment by dynamically allocating radio resources to the at least one radio network node or to the first radio network node based on the indication.

13. The control network node according to claim 4, wherein the performance adjustment comprises one of increasing and reducing transmission power related to the at least one radio network node or to the first radio network node.

14. The control network node according to claim 4, wherein the control network node is configured to trigger the performance adjustment by at least one from a group consisting of:
- stopping the at least one radio network node or the first radio network node from using a channel in the frequency band; and
- ordering the at least one radio network node or the first radio network node to use another channel.

15. The control network node according to claim 4, wherein the control network node is configured to trigger the performance adjustment by one of reducing and increasing the number of radio network nodes sharing the radio resource.

16. The control network node according to claim 4, wherein the indication comprises information related to a waiting time before accessing a channel of the frequency band.

17. The control network node according to claim 4, wherein the control network node is configured to:
- estimate a level of interference experienced by at least one from a group consisting of the first radio network node and the user equipment served by the first radio network node; and take the estimated level of interference into account when triggering the performance adjustment.

18. The control network node according to claim 4, wherein the radio resource comprises at least one from a group consisting of a radio channel, and a set of transmission time slots.

19. A first radio network node for using one or more radio resources in a frequency band, wherein the first radio network node is configured to:
- send an indication related to a performance of the first radio network node, or a performance of user equipment served by the first radio network node;
- evaluate a target performance based on a priority of at least one radio network node and the first radio network node relative to one another, the priority being taken into account by a control network node when triggering a performance adjustment;
- receive an indication of a performance adjustment related to the performance of the first radio network node, or the performance of the user equipment served by the first radio network node; and
- adjust the target performance based on the received indication of the performance adjustment.

* * * * *